(12) United States Patent
Kolahi et al.

(10) Patent No.: US 9,989,392 B2
(45) Date of Patent: Jun. 5, 2018

(54) METHOD FOR OPERATING A CORIOLIS MASS FLOWMETER AND CORRESPONDING CORIOLIS MASS FLOWMETER

(71) Applicant: KROHNE Messtechnik GmbH, Duisburg (DE)

(72) Inventors: Kourosh Kolahi, Duisburg (DE); Ralf Storm, Essen (DE)

(73) Assignee: KROHNE Messtechnik GmbH, Duisburg (DE)

( * ) Notice: Subject to any disclaimer, the term of this patent is extended or adjusted under 35 U.S.C. 154(b) by 6 days.

(21) Appl. No.: 15/410,995

(22) Filed: Jan. 20, 2017

(65) Prior Publication Data

US 2017/0205265 A1  Jul. 20, 2017

(30) Foreign Application Priority Data

Jan. 20, 2016  (DE) .................. 10 2016 100 950

(51) Int. Cl.
*G01F 1/84* (2006.01)
*G01K 7/16* (2006.01)
*G01F 25/00* (2006.01)

(52) U.S. Cl.
CPC ............ *G01F 1/8431* (2013.01); *G01F 1/845* (2013.01); *G01F 1/8436* (2013.01); *G01F 25/0007* (2013.01); *G01K 7/16* (2013.01); *G01F 1/8409* (2013.01); *G01F 1/8463* (2013.01)

(58) Field of Classification Search
CPC ........................................................ G01F 1/84
See application file for complete search history.

(56) References Cited

U.S. PATENT DOCUMENTS

| | | | |
|---|---|---|---|
| 4,896,525 A | 1/1990 | Breimesser | |
| 5,570,300 A | 10/1996 | Henry et al. | |
| 5,774,378 A | 6/1998 | Yang | |
| 8,695,436 B2* | 4/2014 | Bitto | G01F 1/84 |
| | | | 73/861.355 |
| 8,931,346 B2* | 1/2015 | Rieder | G01F 1/8413 |
| | | | 73/658 |
| 9,170,143 B2* | 10/2015 | Van Cleve | G01F 1/84 |
| 9,429,458 B2 | 8/2016 | Hussain et al. | |
| 2011/0167907 A1* | 7/2011 | Bitto | G01F 1/84 |
| | | | 73/32 A |

(Continued)

*Primary Examiner* — Jewel V Dowtin
(74) *Attorney, Agent, or Firm* — David S. Safran

(57) ABSTRACT

A method for operating a Coriolis mass flowmeter (1) having at least one measuring tube (2) and at least one sensor (3), wherein the sensor (3) emits an electric sensor signal depending on the temperature of the sensor (3), the sensor (3) is mechanically coupled to the rest of the Coriolis mass flowmeter (1) via a connection (5) and the connection (5) has a thermal resistance. To provide a method for operating a Coriolis mass flowmeter that makes recognition of a change in the connection possible an electric excitation signal is generated, the excitation signal is impressed in the sensor (3), the sensor signal influenced by the excitation signal is detected, a change between the detected sensor signal and a reference signal is determined and the change between the detected sensor signal and the reference signal is associated with a change in the thermal resistance.

15 Claims, 1 Drawing Sheet

(56) References Cited

U.S. PATENT DOCUMENTS

2016/0084024 A1* 3/2016 Dillard ................... E21B 21/08
                                                        175/48
2017/0074701 A1* 3/2017 Rieder ................. G01F 1/8413
2017/0167906 A1* 6/2017 Henry .................... G01F 1/845

* cited by examiner

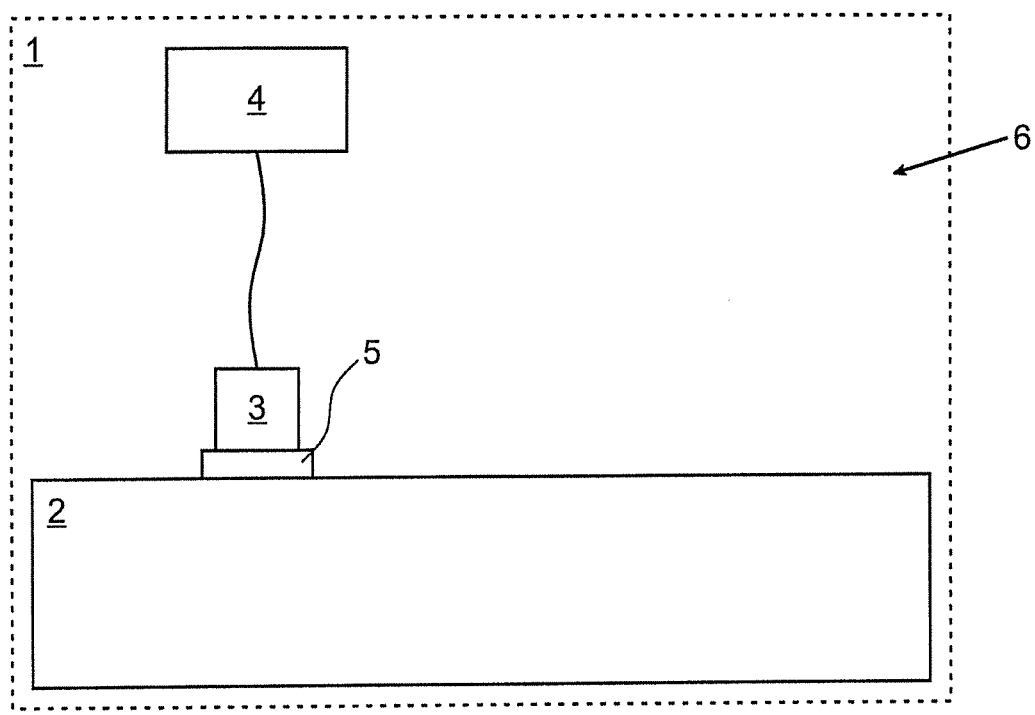

METHOD FOR OPERATING A CORIOLIS MASS FLOWMETER AND CORRESPONDING CORIOLIS MASS FLOWMETER

BACKGROUND OF THE INVENTION

Field of the Invention

The invention relates to a method for operating a Coriolis mass flowmeter having at least one measuring tube and at least one sensor, wherein the sensor emits an electric sensor signal depending on the temperature of the sensor, the sensor is mechanically coupled to the rest of the Coriolis mass flowmeter via a connection and the connection has a thermal resistance.

Description of Related Art

Furthermore, the invention relates to a Coriolis mass flowmeter having at least one measuring tube, at least one sensor and an evaluation unit, wherein the sensor emits an electric sensor signal depending on the temperature of the sensor, the sensor is mechanically coupled to the rest of the Coriolis mass flowmeter via a connection, and the connection has a thermal resistance.

The functional principle of the Coriolis mass flowmeter is that the measuring tube having medium flowing through it is excited to oscillation, wherein the direction of oscillation of the measuring tube and thus that of the medium flowing in the measuring tube has at least one component orthogonal to the direction of flow of the medium in the measuring tube. The orthogonal component of the oscillation of the medium flowing in the measuring tube causes a Coriolis force in the flowing medium, which counteracts the orthogonal components of the oscillation. The Coriolis force causes the occurrence of a phase difference between the oscillation of the measuring tube at each of two different sites on the measuring tube along the longitudinal axis of the measuring tube, which is proportional to the mass flow of the medium through the measuring tube. The Coriolis mass flowmeter measures the phase difference and determines the mass flow of the medium from it.

Generic Coriolis mass flowmeters are known in which the connections have changed causing the measurements of the sensor to be flawed. The changes of the connections can have different causes, such as aging or connection fatigue or external influences on the connections.

SUMMARY OF THE INVENTION

Thus, the object of the current invention is to provide a method for operating a Coriolis mass flowmeter as well as to provide a Coriolis mass flowmeter that makes the recognition of a change in the connection possible.

According to a first teaching, the invention relates to a method, in which the above derived and described object is achieved in that an electric excitation signal is generated, the excitation signal is impressed in the sensor, the sensor signal influenced by the excitation signal is detected, a change between the detected sensor signal and a reference signal is determined and the change between the detected sensor signal and the reference signal is associated with a change in the thermal resistance.

The sensor is designed for measuring a physical variable and emits the electric sensor signal representing the physical variable, depending on the temperature of the sensor. The sensor and the rest of the Coriolis mass flowmeter are thermally coupled via the connection, wherein the thermal coupling is described by the thermal resistance. The thermal coupling causes heat to be exchanged between the sensor and the rest of the Coriolis mass flowmeter when the temperature of the sensor and the temperature of the rest of the Coriolis mass flowmeter are different. The exchanged heat influences the temperature of the sensor and thus the emitted sensor signal. Namely, heat is also exchanged between the sensor and ambient atmosphere; however, this exchange of heat is normally negligible compared to the exchange of heat between the sensor and the rest of the Coriolis mass flowmeter. Influencing the temperature of the rest of the Coriolis mass flowmeter with the exchanged heat is normally also negligible.

A known thermal resistance of the connection can be taken into account in evaluating the sensor signal, so that the measurements of the sensor are not flawed by the known thermal resistance. The change of the thermal resistance, however, causes the thermal resistance to be unknown, whereby the measurements of the sensor are flawed. Accordingly, the thermal resistance characterizes the connection. The change of the thermal resistance, consequently, means a change of the connection that is recognized by the method according to the invention. Preferably, the change of the connection is signaled, in particular, when the change exceeds a predetermined threshold value.

The electric excitation signal impressed in the sensor causes a change of temperature of the sensor. The changed temperature of the sensor causes an exchange of heat between the sensor and the rest of the Coriolis mass flowmeter, the temporal course of the exchange characterizing the thermal resistance. Consequently, the temporal course of the detected signal is also characteristic for the thermal resistance based on the dependence of the sensor signal on the temperature of the sensor. Accordingly, a change of the thermal resistance causes a change of the detected sensor signal.

The excitation signal is generated such that the temperature of the sensor is changed so that the influence of the excitation signal on the sensor signal can be detected. The impressing of the excitation signal in the sensor takes place alternatively or additionally to the supply of the sensor with electric energy, which the sensor requires for measuring the physical variable, for which it is designed.

The change between the detected sensor signal and the reference signal can be of different types. In one example, the detected sensor signal and the reference signal are the same at unchanged thermal coupling and differ from one another at changed thermal coupling. In another example, the detected sensor signal and the reference signal already differ from one another at unchanged thermal coupling and the difference changes with a change in thermal coupling. The temporal course of the detected sensor signal characteristic for the thermal resistance of the connection is reflected by the time constant of the detected sensor signal. Thus, it is provided in an implementation of the method according to the invention that the change between the detected sensor signal and the reference signal is determined in that the time constant of the detected sensor signal and the change between the time constant of the detected sensor signal and the time constant of the reference signal is determined.

It has been recognized that, in the most cases, the thermal coupling via the connection decreases with time and, as a result, the thermal resistance increases and the time constant decreases. For this reason, it is provided in a further development of the present implementation that a decrease of the time constant of the detected sensor signal compared to the time constant of the reference signal is associated with an increase in the thermal resistance of the connection.

It has been further recognized that a change of the thermal coupling goes hand in hand with a change of the mechanical coupling via the connection. Namely, the mechanical coupling decreases when the thermal coupling decreases and vice versa. Thus, it is provided in a further implementation of the method that the change between the detected sensor signal and the reference signal is associated with a change of the mechanical coupling via the connection.

In a further development of the above implementation, it is provided that a decrease of the time constant of the detected sensor signal compared to the time constant of the reference signal is associated with a decrease of the mechanical coupling via the connection. The further development assumes that the change between the detected sensor signal and the reference signal is determined in that the time constant of the detected sensor signal and the change between the time constant of the detected sensor signal and the time constant of the reference signal is determined.

A particularly advantageous influencing of the detected sensor signal by the excitation signal is provided when the excitation signal has the temporal course of a step function. The step of the excitation signal causes interference of the thermal state of equilibrium between the sensor and the rest of the Coriolis mass flowmeter, and the consistency of the excitation in respect to time before and after the step simplifies the determination of the change of the detected sensor signal in respect to the reference signal, since, after the step, there is no longer a changing influence on the sensor signal by the excitation signal. Consequently, a further implementation provides that the temporal course of the excitation signal is generated with a step from a first excitation signal value to a second excitation signal value and constant excitation signal values before and after the step.

It is provided in a further development of the above implementation that the excitation signal is generated so that the first excitation signal value is greater than the second excitation signal value. In this implementation, the power dissipation generated in the sensor by the excitation signal before the step is greater than after the step of the excitation signal, wherein the power dissipation in the sensor is converted into heat. Accordingly, the sensor cools down after the step of the excitation signal by discharging heat from the sensor via the connection to the rest of the Coriolis mass flowmeter.

The electrical sensor signal of the sensor is emitted via two sensor connections. Preferably, the sensor is also supplied with electric energy via the two sensor connections, the energy being required by the sensor for measurement of the physical variables, for which it is designed. The excitation signal impressed in the two sensor connections can be one of the two electric variables electric current and voltage. If the excitation signal is electric current, then it is impressed in one of the two sensor connections and the detected sensor signal is the voltage between the two sensor connections, wherein the voltage represents the influencing of the sensor by the excitation signal. If the excitation signal is a voltage, then it is impressed between the two sensor connections and the detected sensor signal is the current through one of the two sensor connections, wherein the current represents the influencing of the sensor by the excitation signal. Accordingly, the non-impressed electric variable is the sensor signal. Since the implementation of an electric current as excitation signal for the sensor and measurement of a voltage as sensor signal is technically more advantageous than the implementation of a voltage as excitation signal for the sensor a measurement of an electric current as sensor signal, it is provided in a further implementation that the excitation signal is impressed in the sensor as an electric current.

There are different alternatives for obtaining the reference signal. A first alternative provides that a detected sensor signal is used as reference signal. In the detected sensor signal, it is ensured that the connection is in the unchanged, i.e. proper, state. Changes between the sensor signal detected subsequently and the reference signal then indicate a deviation of the connection from the unchanged state. A second alternative initially assumes that the Coriolis mass flowmeter has a further sensor, the further sensor emitting a further electric sensor signal dependent on the temperature of the further sensor, the further sensor being mechanically coupled to the rest of the Coriolis mass flowmeter via a further connection, and the further connection having a further thermal resistance. The second alternative is then wherein a further electric excitation signal is generated, the further excitation signal is impressed in the further sensor, the further sensor signal influenced by the further excitation signal is detected and the detected further sensor signal is used as reference signal. A variation of the second alternative provides that the further excitation signal corresponds to the excitation signal. The second alternative can be further developed the method being carried out with respect to the an additional sensor.

According to a second teaching, the invention relates to a Coriolis mass flowmeter, in which the above derived and described object is achieved. The Coriolis mass flowmeter according to the invention is initially and essentially wherein the evaluation unit is designed for generating an electric excitation signal, impressing the excitation signal in the sensor, detecting the sensor signal influenced by the excitation signal, determining a change between the detected sensor signal and the reference signal and associating the change between the detected sensor signal and the reference signal with a change of the thermal resistance.

The explanations in respect to the method according to the invention also hold true for the Coriolis mass flowmeter according to the invention and vice versa.

A design of the Coriolis mass flowmeter according to the invention provides that the Coriolis mass flowmeter is designed for carrying out a method according to any one of the above implementations, further developments, alternatives, and variations.

A further design of the Coriolis mass flowmeter according to the invention provides that the sensor is a resistive temperature sensor, in particular a thermistor, or a strain sensor, in particular a strain gauge. When the sensor is a temperature sensor, the sensor is designed for measuring the physical variable temperature and emits the sensor signal representing the value of the temperature dependent on the temperature of the sensor. When the sensor is a strain sensor, the sensor is designed for measuring the physical variable tension and emits the sensor signal representing the value of the tension dependent on the temperature of the sensor.

Often, generic Coriolis mass flowmeters have at least one temperature sensor as well as at least one strain sensor. In this case, it would be favorable to use the strain sensor according to the above implementations of the method according to the invention as a further sensor for generating the reference signal and to use the generated reference signal in conjunction with the temperature sensor.

A further design of the Coriolis mass flowmeter provides that the sensor is arranged on the measuring tube via the connection. In a first alternative of this, it is provided that the measuring tube is preferably directly connected to a carrier and the sensor is arranged on the carrier. In a second alternative, it is provided that the measuring tube is preferably directly connected to a carrier and the at least two sensors are arranged on the body formed by the measuring tube and the carrier.

A further design provides that the connection is made using an adhesive bond, in particular by gluing. An alternative to this provides that the connection is made using a forced closure, in particular by screwing. The advantage of a connection made as adhesive bond as opposed to a connection made using force is that the connection has a larger surface and is not selective points. The connection with a large surface causes a lower thermal resistance. The advantage of the connection using force is that the sensor can then be disassembled.

In detail, there are a plurality of possibilities for designing and further developing the method according to the invention and the Coriolis mass flowmeter according to the invention as will be apparent from the following description of a preferred embodiment in conjunction with the accompanying drawings.

BRIEF DESCRIPTION OF THE DRAWINGS

The sole FIGURE schematically depicts an embodiment of the Coriolis mass flowmeter according to the invention.

DETAILED DESCRIPTION OF THE INVENTION

The Coriolis mass flowmeter 1 shown schematically in the FIGURE has a measuring tube 2, a sensor 3 and an evaluation unit 4.

The sensor 3 is a temperature sensor and emits an electric sensor signal dependent on the temperature $\theta_S$ of the sensor 3. It is mechanically coupled to the rest of the Coriolis mass flowmeter 1 via a connection 5, wherein the temperature of the rest of the Coriolis mass flowmeter 1 is $\theta_U$. The connection 5 is characterized by a thermal resistance $R_{SU}$.

The evaluation unit 4 generates an excitation signal with the following characteristics. In the temporal course, there is a step from a first excitation value to a second excitation value. The first excitation value is thereby greater than the second excitation value. The excitation values are constant in terms of time before and after the step. The excitation signal is thus a step function. Since the first excitation signal is greater than the second excitation signal, then sensor 3 cools down after the step.

The evaluation unit 4 impresses the excitation signal in the sensor 3 as electric current. The excitation signal increases the temperature $\theta_S$ of the sensor 3 up to the point in time of the step of the excitation signal, wherein the temperature $\theta_S$ of the sensor 3 is $\theta_{S,0}$ at the point in time of the step.

The evaluation unit 4 detects the sensor signal influenced by the excitation signal at at least two different points in time $t_1$ and $t_2$ after the step and determines the temperature $\theta_S(t_1)$ and $\theta_S(t_2)$ of the sensor 3 from the detected sensor signal at these points in time. Then, the evaluation unit 4 forms the difference temperature $\theta_D(t_1)=\theta_S(t_1)-\theta_U$ and $\theta_D(t_2)=\theta_S(t_2)-\theta_U$ between the sensor 3 and the rest of the Coriolis mass flowmeter 1.

The determination of a change between the detected sensor signal and a reference signal forms the basis of the energy balance for the cooling of the sensor 3, from which a differential equation is derived:

$$\frac{dW_S}{dt} = -\frac{\theta_S - \theta_U}{R_{SU}}, \text{ with: } C_S = \frac{dW_S}{d\theta_S}$$

$$\Rightarrow C_S \frac{d\theta_S}{dt} + \frac{\theta_S}{R_{SU}} = \frac{\theta_U}{R_{SU}}, \text{ with: } \tau = C_S R_{SU}$$

$$\Rightarrow \frac{d\theta_S}{dt} + \frac{1}{\tau}\theta_S = \frac{1}{\tau}\theta_U$$

$$\Leftrightarrow \frac{d(\theta_S - \theta_U)}{dt} + \frac{1}{\tau}(\theta_S - \theta_U) = 0, \text{ since: } \frac{d\theta_U}{dt} = 0,$$

$$\text{with: } \theta_D = \theta_S - \theta_U$$

$$\Rightarrow \frac{d\theta_D}{dt} + \frac{1}{\tau}\theta_D = 0$$

In the equations, in the order according to their first occurrence, $W_S$ is the thermal energy of the sensor 3, t is the time, $C_S$ is the thermal capacity of the sensor 3, and is the time constant of the sensor 3. The energy balance is based on the knowledge that the exchange of heat between the sensor 3 and an ambient atmosphere 6 is negligible compared to the exchange of heat between the sensor 3 and the rest of the Coriolis mass flowmeter 1 and the temperature $\theta_U$ of the rest of the Coriolis mass flowmeter 1 is constant.

$$\theta_D = \theta_{D,0} e^{-\frac{t}{\tau}}, \text{ with: } \theta_{D,0} = \theta_{S,0} - \theta_U$$

is found as solution of the differential equation.

In the solution of the differential equation, $\theta_{D,0}$ is the difference temperature at the point in time of the step of the excitation signal. After the step, thus, the temperature $\theta_S$ of the sensor 3 approaches the temperature $\theta_U$ of the rest of the Coriolis mass flowmeter 1 again over time. It has been thereby recognized that the increase of the temperature $\theta_S$ of the sensor 3 by supplying the sensor 3 with electric energy required by the sensor 3 for measuring the physical variables, for which it is designed, is negligible.

Determining the change between the detected sensor signal and the reference signal is carried out in that the evaluation unit 4 first determines the time constant of the detected sensor signal and then the change between the time constant of the detected signal and the time constant of the reference signal.

Thereby, the evaluation unit 4 determines the time constant of the sensor signal as follows:

$$\theta_D(t_1) = \theta_{D,0} e^{-\frac{t_1}{\tau}}, \theta_D(t_2) = \theta_{D,0} e^{-\frac{t_2}{\tau}}$$

$$\Rightarrow \frac{\theta_D(t_2)}{\theta_D(t_1)} = \frac{e^{-\frac{t_2}{\tau}}}{e^{-\frac{t_1}{\tau}}} = e^{-(t_2-t_1)}$$

$$\Leftrightarrow \tau = \frac{t_1 - t_2}{\ln\left(\frac{\theta_D(t_2)}{\theta_D(t_1)}\right)}$$

The evaluation unit 4 associates the change between the time constant of the detected sensor signal and the time constant of the reference signal with the thermal resistance $R_{SU}$ and emits a signal when the change exceeds a predetermined threshold value.

What is claimed is:

1. Method for operating a Coriolis mass flowmeter having at least one measuring tube and at least one sensor that is mechanically coupled to the rest of the Coriolis mass flowmeter via a connection that has a thermal resistance, comprising the steps of:
emitting an electric sensor signal from the sensor depending on the temperature of the sensor,
generating an electric excitation signal,
impressing the excitation signal on the sensor,
detecting a change of the sensor signal due to the impressing of the excitation signal,
determining a difference between the changed sensor signal and a reference signal, and
associating the difference between the changed sensor signal and the reference signal with a change in the thermal resistance.

2. Method according to claim 1, wherein the difference between the detected sensor signal and the reference signal is determined in that a time constant of the changed sensor signal and a change between time constants of the detected sensor signal and a time constant of the reference signal are determined.

3. Method according to claim 2, wherein a decrease of the time constant of the detected signal as compared to the time constant of the reference signal is associated with a increase of the thermal resistance of the connection.

4. Method according to claim 1, wherein the difference between the changed sensor signal and the reference signal is associated with a change of the mechanical coupling via the connection.

5. Method according to claim 2, wherein the difference between the changed sensor signal and the reference signal is associated with a change of the mechanical coupling via the connection and wherein a decrease of the time constant of the detected sensor signal compared to the time constant of the reference signal is associated with a decrease of the mechanical coupling via the connection.

6. Method according to claim 1, wherein the excitation signal is generated in a temporal course with a step from a first excitation signal value to a second excitation signal value and constant excitation signal values are generated temporally before and after the step.

7. Method according to claim 6, wherein the excitation signal is generated so that the first excitation signal value is greater than the second excitation signal value.

8. Method according to claim 1, wherein the excitation signal is impressed in the sensor in the form of an electric current.

9. Method according to claim 1, wherein the Coriolis mass flowmeter has an additional sensor, wherein the additional sensor emits an additional electric sensor signal depending on the temperature of the additional sensor, wherein the additional sensor is mechanically coupled to the rest of the Coriolis mass flowmeter via an additional connection, the additional connection having a additional thermal resistance, wherein a additional electric excitation signal is generated and impressed on the additional sensor, a change in the additional sensor signal due the additional excitation signal is detected and used as the reference signal.

10. Method according to claim 9, wherein, relative to the additional sensor, the additional excitation signal is generated in a temporal course with a step from a first excitation signal value to a second excitation signal value and constant excitation signal values are generated temporally before and after the step.

11. A Coriolis mass flowmeter, comprising:
at least one measuring tube,
at least one sensor and
an evaluation unit,
wherein the sensor is adapted to emit an electric sensor signal depending on the temperature of the sensor,
wherein the sensor is mechanically coupled to the rest of the Coriolis mass flowmeter via a connection having a thermal resistance,
wherein the evaluation unit is adapted for generating an electric excitation signal and impressing the excitation signal on the sensor, detecting a change in the sensor signal due to the excitation signal, determining a change between the changed sensor signal and a reference signal and associating the change between the detected sensor signal and the reference signal with a change of the thermal resistance.

12. The Coriolis mass flowmeter according to claim 11, wherein evaluation unit is adapted for associated the difference between the changed sensor signal and the reference signal with a change of the mechanical coupling via the connection.

13. The Coriolis mass flowmeter according to claim 11, wherein the sensor is a resistive temperature sensor.

14. The Coriolis mass flowmeter according to claim 11, wherein the sensor is arranged on the measuring tube via the connection.

15. The Coriolis mass flowmeter according to claim 11, wherein the connection is made using an adhesive bond.

* * * * *